United States Patent [19]

Abrahamsson et al.

[11] 4,253,309
[45] Mar. 3, 1981

[54] HEAT PUMP ARRANGEMENT

[76] Inventors: Thore Abrahamsson, Mårdgatan 2A, Västra Frölunda, Sweden, 421 71; Kaj Hansson, Kyrkeby Västergård 63, Stenungsund, Sweden, 444 00

[21] Appl. No.: 974,090

[22] Filed: Dec. 28, 1978

[51] Int. Cl.³ .............. F25B 27/00; F25D 17/02; F25B 27/02; F25B 13/00
[52] U.S. Cl. .................................. 62/2; 62/98; 62/238 E; 62/324 D
[58] Field of Search ............... 62/324 D, 238 E, 353, 62/98, 99, 2

[56] References Cited
U.S. PATENT DOCUMENTS

| 3,744,263 | 7/1973 | Franck | 62/98 |
| 4,030,312 | 6/1977 | Wallin et al. | 62/324 D |
| 4,055,963 | 11/1977 | Shoji et al. | 62/324 D |
| 4,100,763 | 7/1978 | Brody | 62/324 D |
| 4,153,104 | 5/1979 | Ruder | 62/2 |

FOREIGN PATENT DOCUMENTS 1929063 1/1971 Fed. Rep. of Germany ........ 62/324 D

Primary Examiner—Lloyd L. King
Attorney, Agent, or Firm—Holman & Stern

[57] ABSTRACT

The invention concerns a heat pump arrangement for heating of houses. The arrangement comprises a compressor, a condensor and a vaporizer, which is a part of an icing machine. The vaporizer is designed as a heat exchanger and is connected to a circulation system comprising an accumulator, to which the ice slush from the icing machine is delivered. Water from the accumulator is delivered to the icing machine. The water in the accumulator can be heated e.g. by means of a solar energy collector, the outdoor air etc. Surface water or waste water from the household can be delivered to the accumulator and replace the ice slush therein.

9 Claims, 3 Drawing Figures 4,253,309

HEAT PUMP ARRANGEMENT

BACKGROUND OF THE INVENTION

The present invention refers to a heat pump arrangement for heating purposes comprising a vaporizer designed as a heat exchanger, a compressor for compression of a vaporized medium and a condensor incorporated in a heat distribution system, at which the vaporizer is designed as an icing machine arranged to produce ice slush, and the heat generated during the ice formation is emitted to the vaporizer.

There are nowadays strong attempts to economize on energy sources in all ways. For heating purposes solar energy and heat pump technique are therefore two alternative solutions, which become more and more intersesting but which also have their limitations.

For heating purposes solar energy is collected with solar energy collectors, from which the heat is transferred by means of e.g. air or water. Solar energy collectors can only collect a part of the solar energy which is radiated towards it. The efficiency can be about 50%, but depends strongly on a plurality of factors, e.g. the over-temperature of the collector in relation to the air temperature. The efficiency decreases with a rising over-temperature and vice versa. Another problem when utilizing solar energy for heating purposes is that the intensity of the sun is highest during the summer and lowest during the winter and thus inversely related to the heating demands. For this reason some kind of heat accumulator and/or alternative energy sources must be installed in the system.

In some plants they have tried to supply the heating requirements only with the collected solar energy. In this case it is necessary to work with relatively high temperatures on the collectors, and energy must be stored from the summer to the winter. Owing to the high temperatures the efficiency of the collector is considerably decreased, which means that collectors with very large surface areas must be used. Such a plant also needs a big accumulator volume, i.e. due to the fact that the temperaure only can vary between narrow limits (about +95° C. when fully loaded to about +45° C. when the accumulator is unloaded). There have also been attempts to use salt solutions of different kind in order to increase the stored energy per unit of volume and by that decrease the accumulated volume.

In order to decrease the accumulated volume and temporarily increase the efficiency of the collectors, solar energy collectors are sometimes combined with a heat pump. The vaporizer of the heat pump takes heat from the solar energy collector/accumulator system and delivers heat at a higher temperature by means of the condensor to the heat system. By this combination the temperature variation of the accumulator can increase and its volume can be reduced. However the surface areas of the collectors, as the accumulator volume, are still very large if the entire annual heat requirements of a building shall be supplied in this way.

In many cases attempts have been made to supply the heat requirements only by means of heat pumps without solar energy collectors and accumulators. The heat pump then has to take heat from the air or from the ground. The efficiency or heat factor of the heat pump decreases strongly when the temperature of the primary heat source—in this case the outdoor air or the ground—is low, and is therefore especially unfavorable during cold periods when the heat requirement are highest.

The heat pump working with heat from the ground further have the disadvantages that it can be used only for special ground conditions, it has to be placed on a large depth and a large surface of the heat absorbing tube coils is required.

BRIEF DESCRIPTION OF THE INVENTION

The purpose of the present invention is to reduce the above mentioned disadvantages and to improve the efficiency of the solar energy collectors and the heat factor of the heat pump, to decrease the accumulation requirement and to provide an increased accumulation capacity. These purposes have been achieved by means of a heat pump of the kind described in the introduction in which the vaporizer-heat exchanger is connected to a circulation system, to which also an accumulator is connected, ice slash being emitted to said ackumulator, which is provided with a spillway or the like for the ice slush, said spillway being connected to a storage tank for waste- and/or surface water and that a connecting piping is arranged between the accumulator and the storage tank for transferring water from the storage tank to the accumulator.

Through e.g. the Swedish Pat. Nos. 120.265 and 129.679 it is previously known to utilize the heat of congealement when water is frozen to ice in connection with heat pumps. However it is not previously known to connect an ackumulator and a storage tank to the circulation system, which yields several advantages.

BRIEF DESCRIPTION OF THE DRAWINGS

The invention will now be further described with reference to the accompanying drawings, which show two embodiments.

DESCRIPTION OF SOME PREFERRED EMBODIMENTS

Figure 1:
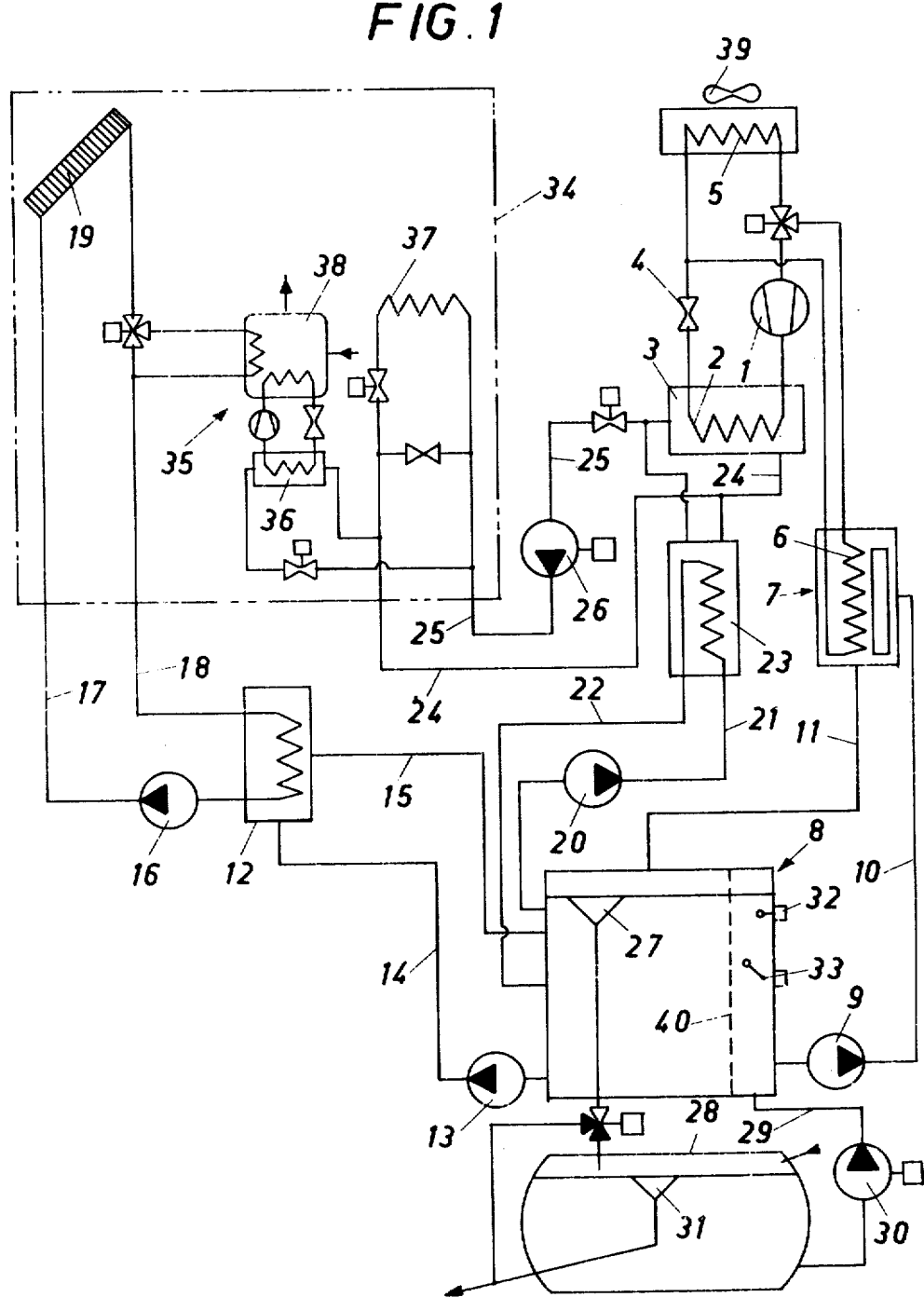
FIG. 1 shows a circuit diagram of the arrangement according to the invention.

The heat pump arrangement according to the invention comprises a compressor 1, a condensor 2, which delivers its heat to a first heat exchanger 3, a throttle member 4, e.g. a valve or a capillary and in the present embodiment vaporizers 5 and 6 connected in parallel.

The vaporizer 5 takes heat from the air forced through it, while the vaporizer 6 is a part of an icing machine, to which is delivered water from an accumulator 8 by way of a pump 9 and a conduit 10, while ice slush from the icing machine 7 is delivered to the accumulator through a conduit 11.

A second heat exchanger 12 is by way of a pump 13 and conduits 14 and 15 connected to the accumulator and by way of a pump 16 and conduits 17 and 18 connected to one or more heat collectors. In the embodiment shown the heat collector is one or more solar energy collectors 19. Alternatively, or as a compliment to the solar energy collector, tube coils placed in the ground, outdoor air and/or air distribution elements, heat exchangers placed in watercourses or waste water etc., can be used.

A further circulation system comprising a pump 20, conduits 21 and 22 and a heat exchanger 23 is connected to the accumulator 8. The heat exchanger 23 is connected to the outgoing conduits 24 and 25 from the condensor heat exchanger 2, 3, a circulation pump 26 being connected to the conduit 25.

Ice slush from the accumulator 8 can by way of a spillway 27 be led to a storage tank 28 for surface water and/or waste water. In order to restore the water volume in the accumulator there is a connecting conduit 29 and a pump 30 between the storage tank 28 and the accumulator. Also in the storage tank there is arranged a spillway 31 connected to the sewer of the building. Impulse members 32 and 33 arranged above and at a distance from each other in the accumulator control the pump 30.

The heat pump assembly 1-6, the icing machine 7, the accumulator 8, the storage tank 28 and the heat exchangers 12 and 23 can be arranged centrally for a number of buildings 34 (only one building is shown) by way of the heat distribution conduits 24 and 25 and the conduits from the heat collectors 17 and 18. In each building unit there can be a smaller heat pump assembly 35, the vaporizer - heat exchanger 36 of which is connected to the heat exchanger/condensor 2, 3 of the central through the distribution conduits 24 and 25. The heating system of the building unit 34 is denoted with 37 and a water heater with 38.

The icing machine 7 can during the summer work as a water heat pump and take heat through a temperature reduction of the accumulator water. During the cold periods in the winter it shall however make ice of the accumulator water, at which it can utilize the heat of congealment of the water for heating purposes. Through this the specific accumulation capacity can be increased with about 100% compared to a pure change of temperature of the water. Besides the average temperature in the accumulator 8 and the solar energy collector 19 will be essentially lower when making ice compared to a pure change of temperature in the accumulator, which substantially increases the efficiency of the solar energy collectors during the winter. (During e.g. the period November–January the utilized energy can be increased with about compared to the result reached with the collector temperature $+40°$ C.).

By the combination with the vaporizer 5 it is possible to be economical with and only utilize the accumulated solar energy during cold periods, while the outdoor air is utilized as a primary heat source when this is favourable. By that the required accumulator volume can be further reduced at the same time as the average heat factor of the heat pump is considerably increased.

Figure 2:
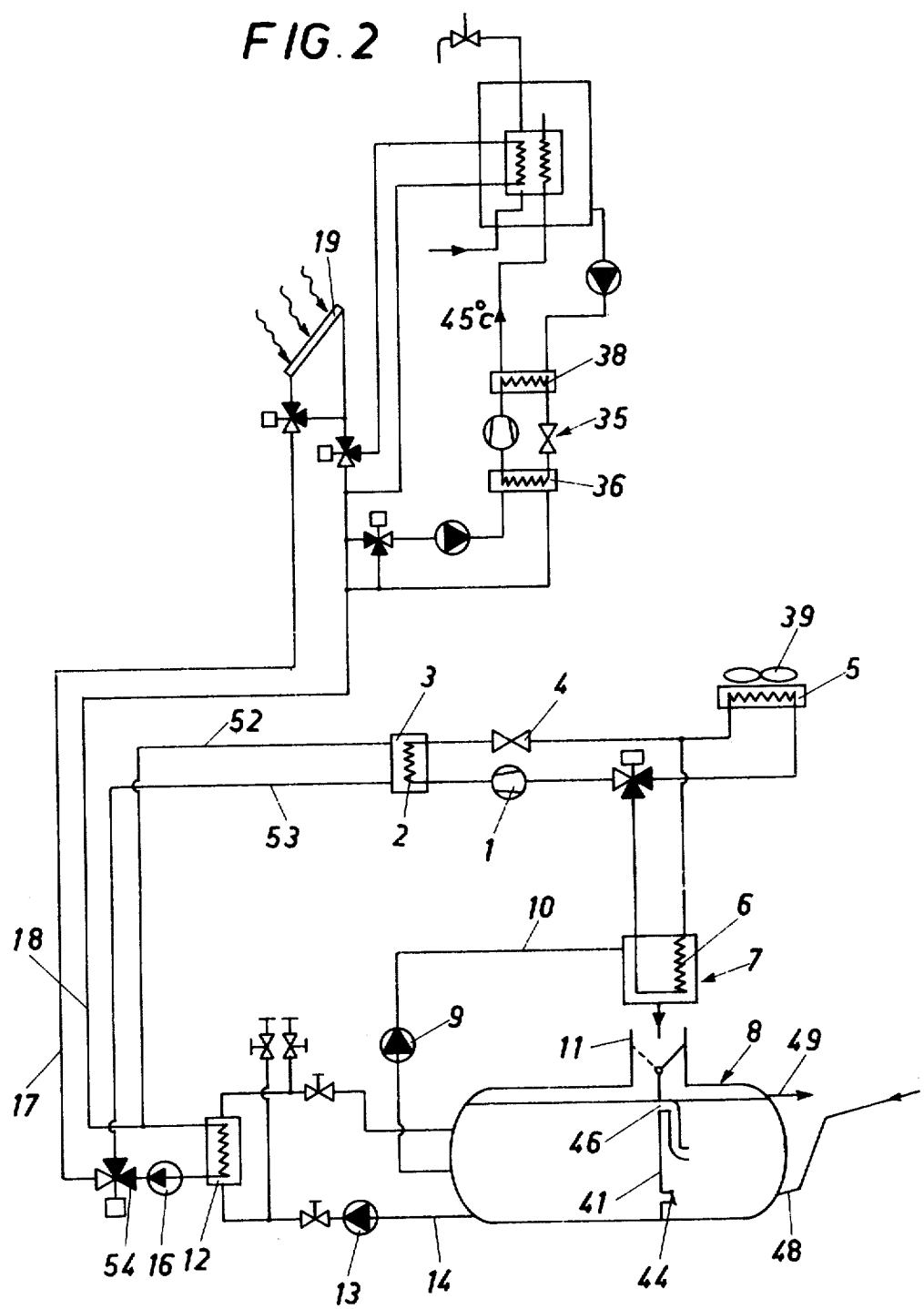
FIG. 2 shows a diagram of a simplified arrangement.
Figure 3:
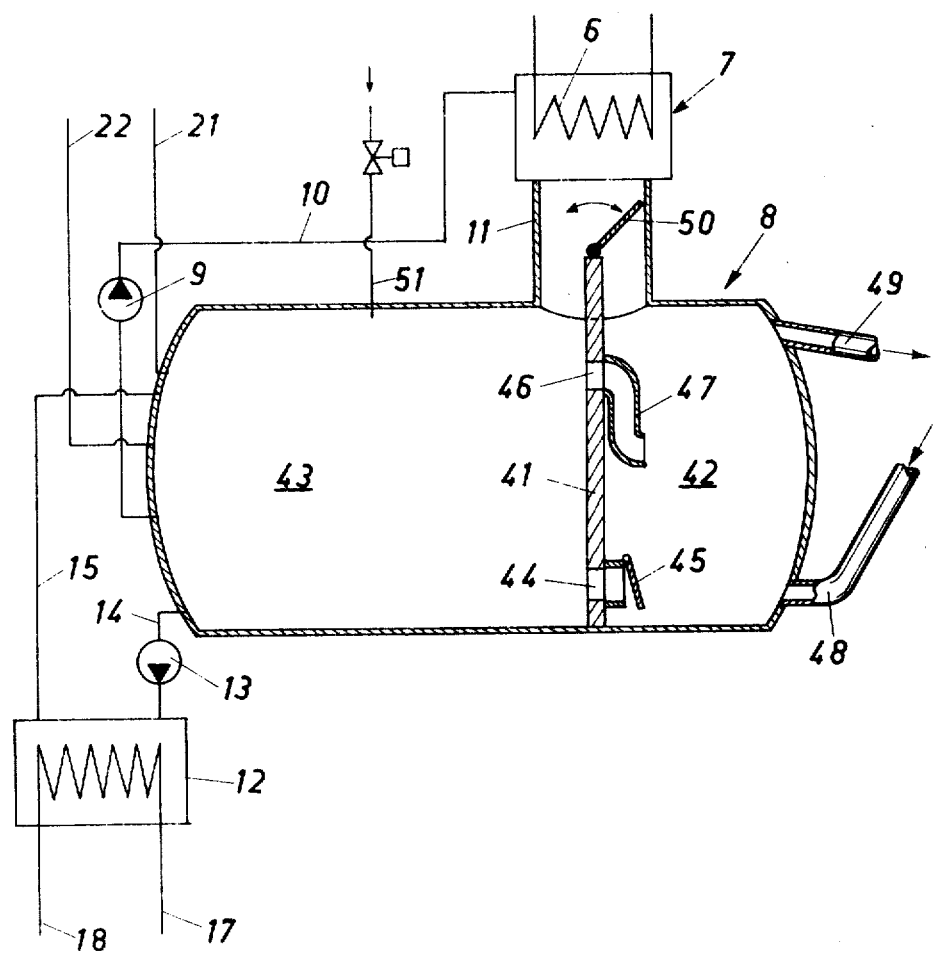
FIG. 3 shows a modified embodiment of the accumulator.

In FIG. 2 there is shown a modified embodiment of the ackumulator 8, which is constructed as a storage tank for waste water—but not from toilets which is directly supplied to the sewrage—where the waste water is also is utilized as accumulator water. The storage tank is by a separating wall 41 divided into a first chamber 42 and a second chamber 43. In the separating wall, which can be heat-insulated, there is in its lower part arranged a passage 44, which is provided with a non-return valve 45, which opens in the direction towards the first chamber. In the upper part of the separating wall 41 there is arranged a second passage 46, to which a tube bend 47 is connected, which extends a distance down into the first chamber 42. The intake 48 of the storage tank is arranged in the lower part of the first chamber 42 while its outlet is arranged in the upper part of said chamber on a level somewhat above the passage 46. The outlet of the icing machine 7 is through a connecting passage 11 connected to the storage tank 8 and is by means of a valve 50 connectible to the first or the second chamber 42 or 43.

The icing machine 7 is supplied with water from the second chamber 43 of the storage tank through the conduits 10 and the pump 9. To the second chamber 43 of the storage tank there is finally connected a dilution water conduit 51.

The assembly works in the following way: The circulation pump 26 (FIG. 1) maintains the circulation in the heat system. If the temperature in the solar energy collectors 19 is higher than in the accumulator 8 the circulation pumps 13 and 16 are started for transferring solar heat to the accumulator and load it. When the temperature of the solar energy collectors is equal with or lower than the accumulator temperature the pumps 13 and 16 are stopped.

If the temperature of the accumulator is higher than the prescribed temperature of the hot water the pump 20 is started, at which heat can be transferred directly to the hot water by means of the heat exchanger 23 without a heat pump. These conditions can exist during the summer.

Later on the temperature of the accumulator decreases and when it e.g. only is $+3°$ C. higher than the prescribed temperature of the hot water the pump 20 is stopped and the heat pump 1-6 and the icing machine 7 are started. If the accumulator temperature is e.g. only $2°$ C. below the temperature of the outdoor air or higher the pump 30 is also started and heat is taken from the accumulator. When the outdoor temperature is higher the pump 30 is stopped and the vaporizer fan 39 is started, at which the heat pump takes heat from the outdoor air.

In larger plants the outdoor air vaporizer can be replaced by a separate outdoor air heat pump. In such a case the air vaporizer must however be started and the icing machine be stopped, when heat is taken from the outdoor air.

The new method gives favourable working conditions for the heat pump/the icing machine and the required accumulator volume and surface area of the solar energy collectors are reduced. It is known that the outdoor temperature varies according to a sine curve with a maximum about $2^{oo}-3^{oo}$ o'clock in the day and a minimum about $2^{oo}-3^{oo}$ o'clock in the night. As well the temperature as the temperature variations varies from place to place and for different times. An amplitude of $5°-10°$ C. from night to day is however normal.

This means e.g. that the average temperature in the day can be about $+3°$ C. while it in the next night is $-3°$ C. According to the invention the heat pump can then work with the air vaporizer during the daytime, while heat from the solar energy collectors simultaneously melts the ice in the accumulator from the night before. When the outdoor temperature gradually falls a change is made, at which the icing machine starts to work and takes heat from the accumulator during the night. The icing machine then works with a considerably better heat factor than if heat were taken from the outdoor air (4,3 and 3,7 resp.). At a lower outdoor temperature the difference is bigger.

The arrangement described above has been based on the condition that the heat pump/icing machine shall deliver heat to a separate heat system with a temperature, which can be used directly for heating purposes. An interesting variant is to arrange a central "district heating system" where the solar energy collector/accumulator after for several houses are coordinated, which then are provided with own local heat pump plants 35 for pumping heat to a usable temperature. The common central plant should then on one hand store energy and on the other hand be provided with an icing machine/air heat pump, which pumps heat (about +5° to +10° C.) to the "primary water". The local heat pumps 35 then can be relatively simple and of the mediatype water/water with a good efficiency.

In the embodiment according to FIG. 2 the ackumulator is loaded with solar energy in the same way as above. When the sun does not shine, interchange of heat from the accumulator to the low tempered distribution net can be made with the same heat exchanger as during the loading. If the accumulator temperature is higher than the temperature of the outdoor air heat is taken from the accumulator to the heat pump. At higher outdoor temperatures the vaporizer fan 39 is started and heat is taken from the outdoor air. If then the accumulator temperature is lower than the temperature ($t_2$) of the return water it is also possible to start the loading pumps 13 and 16 of the accumulator, and thus during "not sunny days" load the accumulator with outdoor air heat by means of the heat pump. For this purpose the heat exchanger 3 is through conduits 52 and 53 connected with the conduits 17 and 18, at which a three-way valve 54 controls the flow way of the medium. This arrangement gives an average heat factor of about 8 to 10 of the central plant and of about 4,5 of the local heat pump plants. The arrangement also gives special stabile and simple working conditions for the local heat pump plants.

During the cold winter months the number of sunny days and sunny hours are few. It would therefore be advantageous if not all the ice produced by the icing machine had to be melted. In the two above described systems this can be achieved if a part of the ice slush is discharged through the sewerage and is replaced with new water. The new water can either be surface or drainage water, which has previous been collected in a storage tank 28, or it can be waste water from the household. In the latter case the toilet discharge has to be separated from the rest of the waste water before the collection in a storage tank.

The atmospheric precipitation amounts normally to about 50–100 mm per month. Collected rain or melted snow from the roof of a house can thus be about 5 m³ per month. If by means of the icing machine ice is made of e.g. 70% of the collected atmospheric precipitation and the ice slush is discharged through the sewerage it is according to this example possible to obtain 325 kWh/month, which corresponds to about 15% of the heat requirements. If instead the waste water is utilized, which normally amounts to about 0.5 m³/day and family (4 persons), it is possible to obtain energy both by a pure temperature fall from an average temperature of about +20° C. to 0° C. and by ice production of approximately 70% of the total flow. This gives a monthly energy supply of about 1300 kWh/month, which corresponds to about 60% of the heat requirements. The utilization of waste water in this way can however involve deposit problem, at which heat exchangers etc. have to be cleaned at short intervals.

This later described system would work in the following way. The solar energy collector and heat pump plant works in the same way as described above. Thus the icing machine during certain periods makes ice, which is collected in the accumulator and later on is melted by solar heat from the solar energy collectors. Simultaneously with this process surface or waste water is collected in a storage tank placed in the ground. When the tank is full the water is automatically discharged by way of a spillway to the public surface or waste water net.

During a cold period with few sunny hours the sun cannot melt all the ice produced by the icing machine. This means that the amount of ice in the accumulator increases and the water amount decreases. When the water amount is below a certain level a pump 30 is started, which takes up water from the storage tank 28 to the accumulator 8, at which a corresponding amount of ice slush is discharged from the accumulator to the storage tank or directly to the surface or waste water system. This arrangement is thus a good complement to the solar energy collector and heat pump system and permits a reduction of the size of the solar energy collectors as well as of the accumulator volume. In the case waste water is utilized the solar energy collector system could even be excluded and the heating be based only on the combination icing machine/air heat pump, where the air heat pump during some periods also can be utilized for loading the accumulator according to the previous description.

The combined accumulator and storage tank 8 shown in FIG. 2 is loaded during the summer in such a way that heat from the heat collectors 19 is delivered to the heat exchanger 12, which transfers the heat to the second chamber 43 of the tank. In said chamber can dependent on the type of heat collectors used the temperature amount of e.g. +65° C., while there is a normal waste water temperature which is lower and e.g. +20° C. in the first chamber 42 of the tank. The unloading of the tank is in the summer case made in the same way as was described above in connection with FIG. 1 by means of the conduits 21 and 22, the pump 20 and the heat exchanger 23.

When the outdoor temperature is lower, e.g. during the spring and autumn, the heat requirement is increased so that there gradually will be a lower temperature in the second chamber 43 than in the first chamber 42, at which through a thermosiphon effect a circulating flow is achieved in the tank, which equalizes the heat difference between the two chambers, at which energy is transferred from the waste water flow in the chamber 42 to the chamber 43. This circulation can be obtained by opening the nonreturn valve 45 in the passage 44 in the direction towards the first chamber 42.

The level difference between the second passage 46 in the separation wall 41 and the outlet 49 has been chosen so that any light impurities like e.g. fat continuously rises to the water surface and are discharged from the tank without coming into the second chamber 43 to any substantial extent.

The loading of the storage tank 8 during the winter is made substantially with the heat, which can be received from the waste water even if the solar energy through the collectors also makes a certain contribution. The heat pump produces ice slush, which at first hand is delivered to the first chamber 42 of the storage tank. If the temperature in the first chamber 42 would fall e.g. below +5° C. the valve 50 is switched over, so that the ice slush is delivered to the second chamber 43 in order to be melted by solar energy and waste water heat later on. If the heat requirements are very high and the delivery of heat from the solar energy collectors and the waste water flow are small, the amount of ice slash in the second chamber can be so high that no further ice slash can be received, at which the valve 50 is switched over again, so that the ice slush is delivered to the first chamber, at the same time as a valve is opened in the cold water conduit, so that water can flow into the second chamber 43 of the tank. Water from this chamber is pumped to the icing machine or flows through the passages 44 and 46 to the first chamber and brings on its way to the outlet ice slush with, which is delivered to the sewerage.

If the local conditions are such that the combined accumulator and storage tank 8 will be located higher than the sewer an immersable pump is placed in a manhole or similar, which pump delivers waste water to the tank.

Since practically all functions of the plant are temperature dependent the control of the plant is relatively simple to perform by means of temperature meters.

The invention is not limited to the embodiments described above and shown in the drawings, but a number of variations are possible within the scope of the claims. It would thus be possible to place the incoming machine e.g within the combined accumulator and storage tank 8, at which the feed pump 9 with the conduit 10 to the icing machine 7 can be excluded. It would also be possible to place the winding of the heat exchanger 12 connected to the conduits 17 and 18 in the storage tank 8, at which the pump 13 and the circulation conduits 14 and 15 can be excluded.

What we claim is:

1. A heat pump arrangement for heating purposes comprising:
   heat exchanger means in the form of a vaporizer;
   a compressor for compressing a vaporized medium;
   a circulation system;
   condensor means for delivering heat to a heat distribution system;
   said vaporizer comprising an icing machine for producing ice slush, heat generated during the ice formation being emitted to the vaporizer, said vaporizer being connected to said circulation system;
   an accumulator connected to said vaporizer, said accumulator containing water heated by at least one of solar energy, outdoor air, waste water and surface water;
   spillway means for delivering ice slush from the vaporizer to said accumulator;
   means for delivering water from the accumulator to said icing machine; and
   means for delivering water to the accumulator for replacing the ice slush discharged therefrom.

2. A heat pump arrangement as claimed in claim 1, wherein said spillway means is connected to a storage tank for waste and/or surface water and a connecting pipe is arranged between the accumulator and the storage tank for transferring water from the storage tank to the accumulator.

3. A heat pump arrangement as claimed in claim 1, wherein the accumulator is designed as a storage tank for waste water or the like, which is divided by a separating wall into two chambers, a lower passage provided with a nonreturn valve and an upper passage being arranged in said separating wall, said lower and upper passages admitting the liquid to circulate in one direction in the tank.

4. A heat pump arrangement as claimed in claim 3, wherein the outlet of the icing machine is alternatively connectable to one of said chambers.

5. A heat pump arrangement as claimed in claim 3 or 4, wherein the inlet of the accumulator-storage tank is arranged at the lower part of the first of said chambers and the outlet of said tank is arranged at the upper part of said chamber, at which the outlet is located on a level above the upper passage in the separating wall.

6. A heat pump arrangement as claimed in claim 3, wherein the icing machine is placed in the accumulator.

7. A heat pump arrangement as claimed in claim 5, wherein a water intake of the icing machine is connected to the second chamber of the accumulator-storage tank.

8. A heat pump arrangement as claimed in claim 6, wherein a water intake of the icing machine is connected to the second chamber of the accumulator-storage tank.

9. A heat pump arrangement as claimed in claim 5, wherein a cold-water conduit is connected to the second chamber of the accumulator-storage tank.

* * * * *